(12) United States Patent
Dorovsky et al.

(10) Patent No.: US 8,867,306 B2
(45) Date of Patent: Oct. 21, 2014

(54) RESONANCE METHOD OF RADIAL OSCILLATIONS FOR MEASURING PERMEABILITY OF ROCK FORMATIONS

(75) Inventors: Vitaly N. Dorovsky, Novosibirsk (RU); Alexander I. Fedorov, Novosibirsk (RU); Vladimir Dubinsky, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 628 days.

(21) Appl. No.: 12/348,994

(22) Filed: Jan. 6, 2009

(65) Prior Publication Data

US 2009/0180350 A1     Jul. 16, 2009

Related U.S. Application Data

(60) Provisional application No. 61/020,495, filed on Jan. 11, 2008.

(51) Int. Cl.
*G01V 1/00* (2006.01)
*G01V 1/44* (2006.01)
*G01V 1/30* (2006.01)
*G01V 1/50* (2006.01)

(52) U.S. Cl.
CPC .......... *G01V 1/44* (2013.01); *G01V 2210/6246* (2013.01); *G01V 1/306* (2013.01); *G01V 1/50* (2013.01)
USPC ........................................................ 367/25

(58) Field of Classification Search
CPC ....................... G01V 1/306; G01V 2210/6246
USPC ................................................. 367/25, 29, 38
See application file for complete search history.

(56) References Cited

U.S. PATENT DOCUMENTS

| | | | |
|---|---|---|---|
| 3,900,826 A | 8/1975 | Dowling et al. | |
| 3,962,674 A | 6/1976 | Howell | |
| 4,834,210 A * | 5/1989 | Kennedy | 181/106 |
| 5,218,573 A | 6/1993 | Katahara | |
| 5,473,939 A * | 12/1995 | Leder et al. | 73/152.12 |
| 5,784,333 A | 7/1998 | Tang et al. | |
| 6,415,648 B1 * | 7/2002 | Peeters | 73/38 |
| 2008/0105426 A1 | 5/2008 | Di et al. | |
| 2008/0175099 A1 * | 7/2008 | Hawthorn et al. | 367/25 |
| 2008/0306692 A1 | 12/2008 | Singer et al. | |
| 2009/0310442 A1 * | 12/2009 | Love et al. | 367/49 |

OTHER PUBLICATIONS

A.M.Blokhin, V.N. Dorovsky. "Mathematical modeling in the theory of multivelocity continuum", New York, Nova Science Publishers Inc., 1995, pp. 1-174.
Extended European Search Report for EP Application No. 09700412. 1-1559, dated Feb. 17, 2014, pp. 1-7.

* cited by examiner

*Primary Examiner* — Krystine Breier
(74) *Attorney, Agent, or Firm* — Cantor Colburn LLP

(57) ABSTRACT

A method for determining permeability of a porous medium of a formation, the method including: placing a logging instrument into a borehole that traverses the porous medium, the borehole filled with a borehole fluid; measuring a pressure, $p^{(1)}$, of an acoustic wave in the borehole at about a boundary between the porous medium and the borehole, the acoustic wave comprising a frequency that is about a resonant frequency of a system that includes the borehole and the porous medium; calculating the permeability from the pressure; and providing the permeability as output to a user.

20 Claims, 6 Drawing Sheets

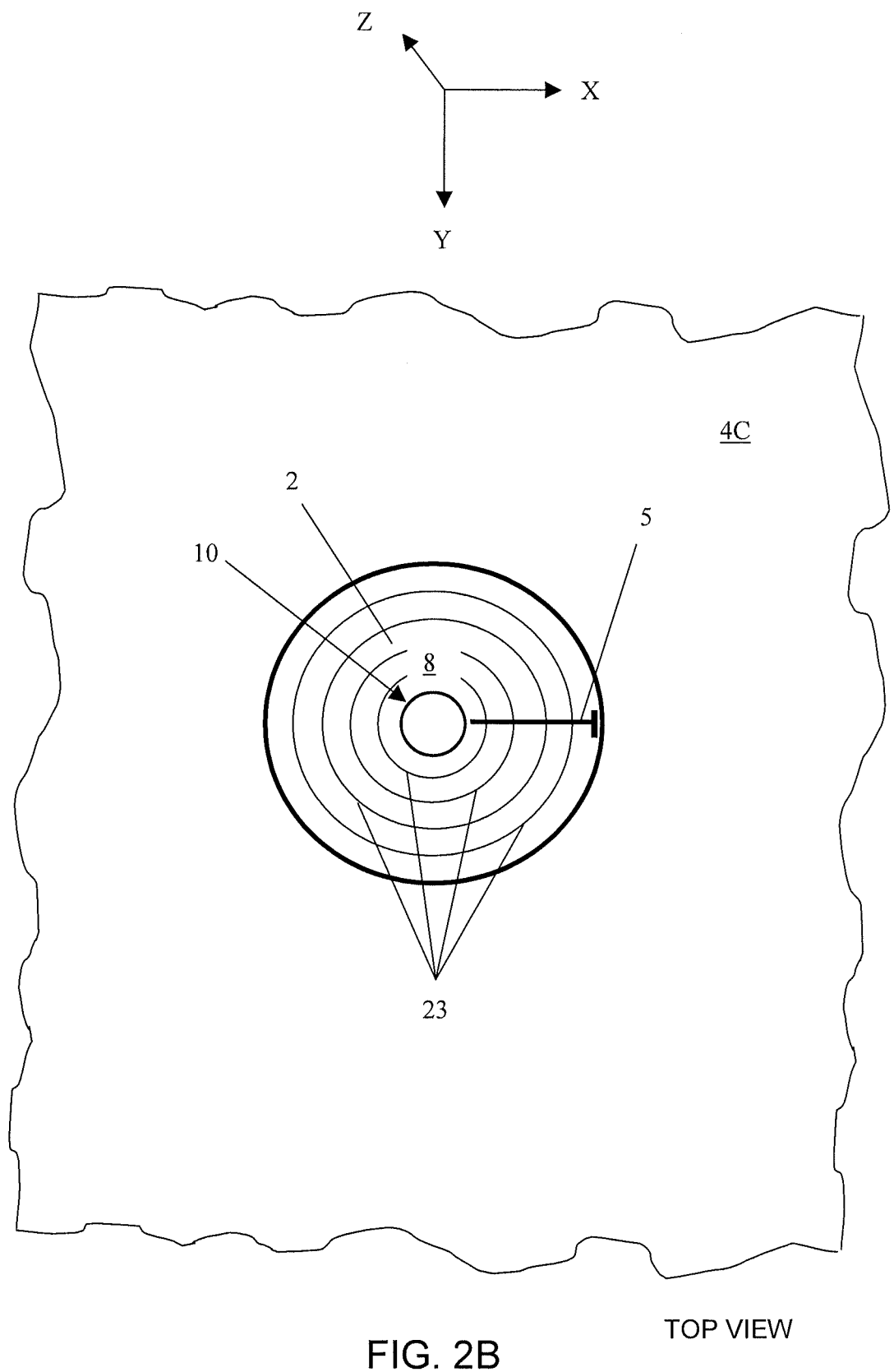
FIG. 2B    TOP VIEW

RESONANCE METHOD OF RADIAL OSCILLATIONS FOR MEASURING PERMEABILITY OF ROCK FORMATIONS

CROSS REFERENCE TO RELATED APPLICATIONS

This application is filed under 37 CFR §1.53(b) and claims benefit of an earlier filing date under 35 U.S.C. 120 to U.S. Provisional Patent Application No. 61/020,495, filed Jan. 11, 2008, which is incorporated by reference herein in its entirety

BACKGROUND OF THE INVENTION

1. Field of the Invention

The invention disclosed herein relates to a technique for measuring permeability of geologic formations.

2. Description of the Related Art

In exploration for hydrocarbons, it is important to make accurate measurements of properties of geologic formations. In particular, it is important to determine the various properties with a high degree of accuracy so that drilling resources are used efficiently.

Generally, oil and gas are accessed by drilling a borehole into the subsurface of the earth. The borehole also provides access for taking measurements of the geologic formations.

Well logging is a technique used to take measurements of the geologic formations from the boreholes. In one embodiment, a "logging tool" is lowered on the end of a wireline into the borehole. The logging instrument sends data via the wireline to the surface for recording. Output from the logging instrument comes in various forms and may be referred to as a "log." Many types of measurements are made to obtain information about the geologic formations. One type of measurement involves determining permeability of a formation.

The permeability of a formation is important to know because the permeability is a measurement of an ability of the formation to transmit fluids such as hydrocarbons. One can use the permeability of a formation to determine an amount of hydrocarbons that can be recovered from the formation.

Therefore, what are needed are techniques for logging the permeability of geologic formations.

BRIEF SUMMARY OF THE INVENTION

Disclosed is one example of a method for determining permeability of a porous medium of a formation, the method including: placing a logging instrument into a borehole that traverses the porous medium, the borehole filled with a borehole fluid; measuring a pressure, $p^{(1)}$, of an acoustic wave in the borehole at about a boundary between the porous medium and the borehole, the acoustic wave comprising a frequency that is about a resonant frequency of a system that includes the borehole and the porous medium; calculating the permeability from the pressure; and providing the permeability as output to a user.

Also disclosed is one embodiment of an apparatus for determining permeability of a porous medium in a formation traversed by a borehole, the apparatus including: an acoustic wave source for generating an input acoustic wave into the borehole in substantially a radial direction with respect to the longitudinal axis of the borehole, the borehole filled with a borehole fluid; an acoustic wave receiver for receiving an acoustic wave from the porous medium, with the receiver in the borehole at about a boundary between the porous medium and the borehole; and an electronic unit for measuring a pressure, $p^{(1)}$, of the acoustic wave received by the receiver, the acoustic wave comprising a frequency that is about a resonant frequency of a system that includes the borehole and the porous medium; calculating the permeability from the pressure; and providing the permeability as output to a user.

Further disclosed is one example of a computer program product including machine readable instructions stored on machine readable media for determining permeability of a porous medium in a formation traversed by a borehole filled with a borehole fluid, the product including machine executable instructions for: determining a resonant frequency of a system that includes the borehole and the porous medium; measuring a pressure, $p^{(1)}$, of an acoustic wave in the borehole at about a boundary between the porous medium and the borehole, the acoustic wave having a frequency that is about a resonant frequency of the system; calculating the permeability from the pressure; and providing the permeability as output to a user.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

FIGS. 2A and 2B, collectively referred to as FIG. 2, illustrate aspects of acoustic waves in a formation;

DETAILED DESCRIPTION OF THE INVENTION

The teachings provide techniques for determining permeability of a porous medium in a formation penetrated by a borehole. The techniques are based on solving a relationship relating the permeability to several factors such as porosity of the porous medium, sound velocities in a borehole medium and the porous medium, fluid viscosity of the borehole medium and formation fluid, and an effect on formation fluid pressure resulting from an acoustic wave resonating within the formation. By either knowing or measuring the several factors, the permeability can be determined. The techniques include method and apparatus for determining the permeability.

Before the invention is discussed in detail, certain definitions are provided. The term "permeability" relates to an ability of a formation to transmit a fluid. The term "borehole medium" or "borehole fluid" relates to a fluid filling the borehole. The term "porous medium" relates to a formation that includes a porous matrix filled with a formation fluid. The term "acoustic system" relates to an acoustic structure formed by the porous medium of a formation and the borehole filled with the borehole medium. The term "resonant frequency" relates to a frequency of an acoustic wave that is created by radial oscillations in the acoustic system. The radial oscillations are formed by a superposition of an input acoustic wave and a reflected acoustic wave. The radial oscillations at the resonant frequency may be referred to as an "eigenwave."

Generally, the amplitude of the eigenwave is greater than the amplitude of the input acoustic wave or the reflected acoustic wave.

Figure 1:
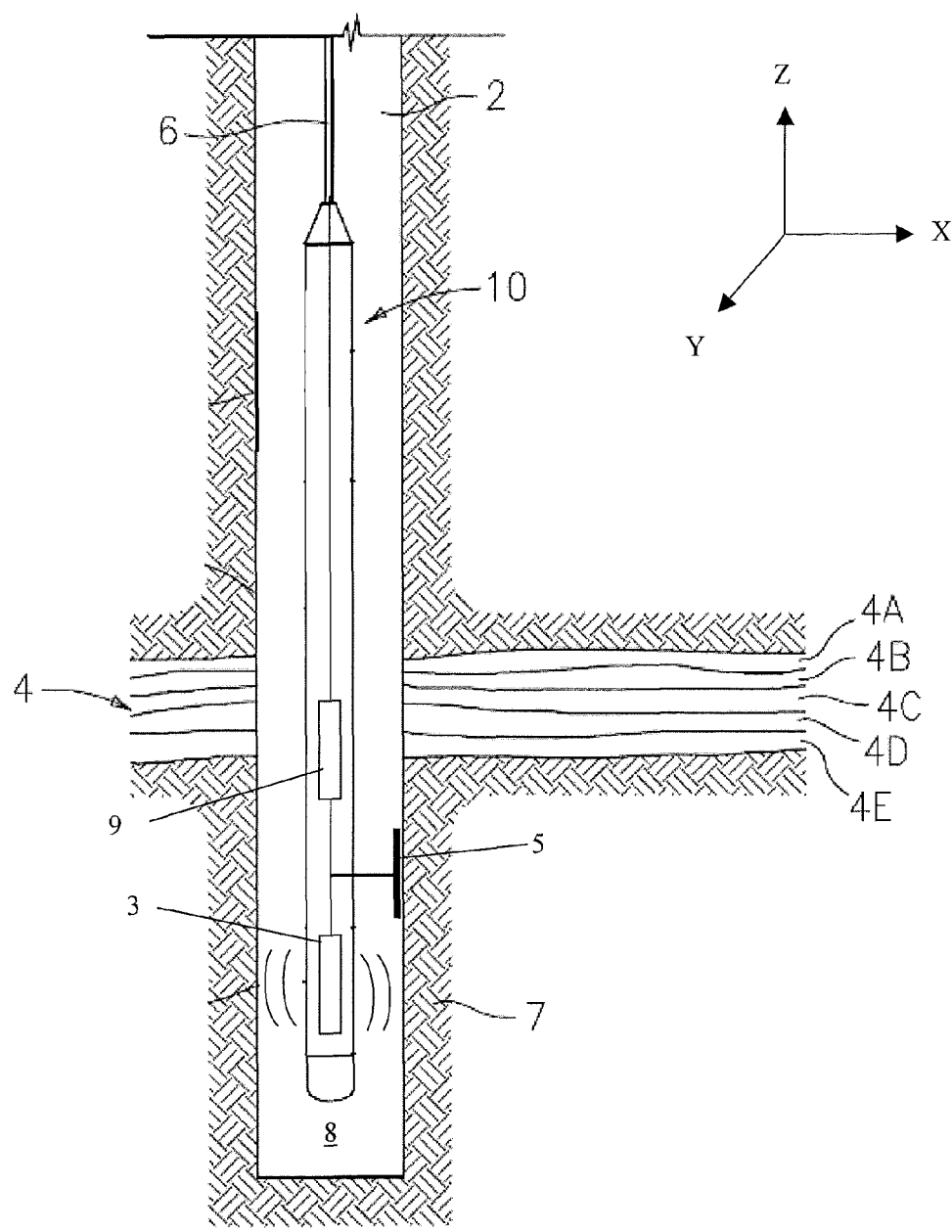
FIG. 1 illustrates an exemplary embodiment of a logging instrument in a borehole penetrating the earth.

Referring to FIG. 1, one embodiment of a well logging instrument 10 is shown disposed in a borehole 2. The borehole 2 is drilled through earth 7 and penetrates formations 4, which include various formation layers 4A-4E. The logging instrument 10 is generally lowered into and withdrawn from the borehole 2 by use of an armored electrical cable 6 or similar conveyance as is known in the art. In the embodiment of FIG. 1, an acoustic wave source 3 and an acoustic receiver 5 are shown disposed within the logging instrument 10. FIG. 1 also depicts an electronic unit 9 shown disposed within the instrument 10. The electronic unit 9 controls operation of the acoustic wave source 3 and the acoustic receiver 5. In addition, the electronic unit 9 processes output from the acoustic receiver 9. The output is used to determine the permeability of a layer of the formations 4.

In some embodiments, the borehole 2 includes materials such as would be found in oil exploration, including a mixture of liquids such as water, drilling fluid, mud, oil and formation fluids that are indigenous to the various formations. The materials are referred to as borehole medium 8, referring to FIG. 1. One skilled in the art will recognize that the various features as may be encountered in a subsurface environment may be referred to as "formations." Accordingly, it should be considered that while the term "formation" generally refers to geologic formations of interest, that the term "formations," as used herein, may, in some instances, include any geologic points of interest (such as a survey area).

For the purposes of this discussion, it is assumed that the borehole 2 is vertical and that the formations 4 are horizontal. The teachings herein, however, can be applied equally well in deviated or horizontal wells or with the formation layers 4A-4E at any arbitrary angle.

The teachings are equally suited for use in logging while drilling (LWD) applications and in open-borehole and cased-borehole (in a perforated zone) wireline applications. In LWD applications, the logging instrument 10 may be disposed in a drilling collar. When used in LWD applications, drilling may be halted temporarily to prevent vibrations while the logging instrument 10 is used to measure the permeability of a layer of the formations 4.

Figure 2A:
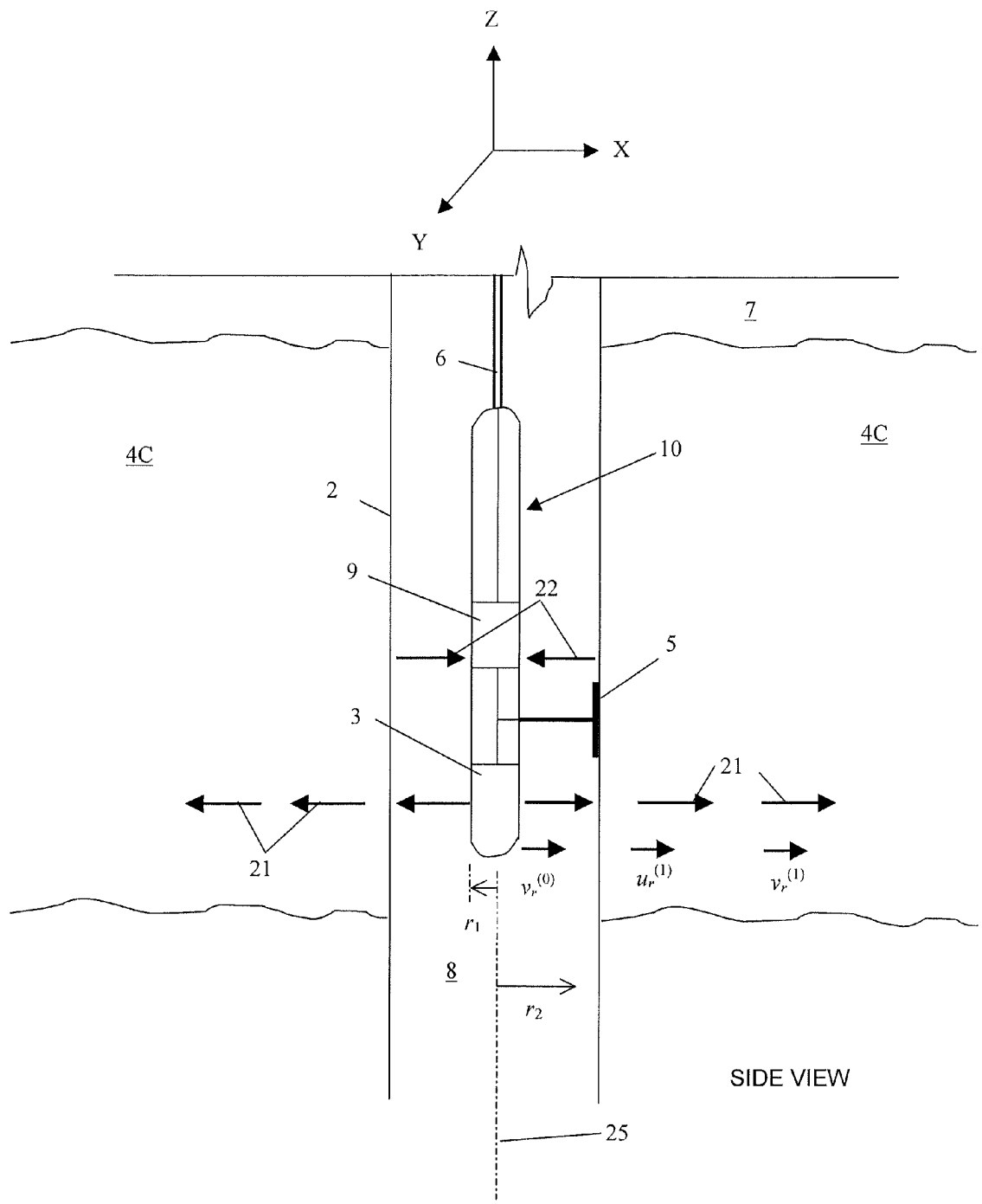

FIG. 2 illustrates aspects of acoustic waves in a layer of the formations 4, formation layer 4C for example. (Layer 4C is used to represent any layer in the formations 4.) Referring to FIG. 2A, the acoustic wave source 3 generates an input acoustic wave 21 radially (in the X-Y plane) from the logging instrument 10. (Radial directions are normal to longitudinal axis 25 shown in FIG. 2A.) The input acoustic wave 21 propagates through the borehole medium 8 and into the formation layer 4C. A portion or all of the driving acoustic wave 21 may be reflected from a boundary between the layer 4C (a porous medium) and the borehole 2 to form a reflected acoustic wave 22. The reflected acoustic wave 22 may be received by the acoustic receiver 5 close to the boundary between the formation layer 4C and the borehole 2. Once the magnitude of a combination of the input acoustic wave 21 and the reflected acoustic wave 22 is received by the acoustic receiver 5, the electronic unit 9 can process an associated output of the acoustic receiver 5. The processing can determine an amplitude or pressure of the eigenwave.

There are a number of frequencies of the input acoustic wave 21 in the borehole 2 such that the reflected acoustic wave 22 resonates with the input acoustic wave 21. If the frequency of the input acoustic wave 21 is equal to a resonant frequency of the acoustic system (formed by the formation layer 4C and the borehole 2 filled with the borehole medium), then a resonance condition can occur. When the resonance condition occurs, an eigenwave can be formed. The eigenwave is formed by the superimposition of the input acoustic wave 21 and the reflected acoustic wave 22 upon each other. The input acoustic wave 21 and the reflected acoustic wave 22 are generally in phase with each other to form the eigenwave. In general, the amplitude of the eigenwave is greater than the amplitude of each of the driving acoustic wave 21 and the reflected acoustic wave 22.

Referring to FIG. 2A, the radius of the logging instrument 10 is depicted as $r_1$. The radius of the borehole 2 is depicted as $r_2$. Also depicted in FIG. 2A are the hydrodynamic velocity $v_r^{(0)}$ of the borehole medium 8, the hydrodynamic velocity $v_r^{(1)}$ of the formation fluid or electrolyte in the layer 4C of the formations 4, and the hydrodynamic velocity $u_r^{(1)}$ of the porous matrix in the layer 4C.

FIG. 2B illustrates a top view of the borehole 2 for depicting aspects of the eigenwave. Referring to FIG. 2B, an eigenwave 23 is formed when the frequency of the input acoustic wave 21 is about equal to the resonant frequency of the acoustic system (formed by the porous medium of layer 4C and the borehole 2 filled with the borehole medium 8). The eigenwave 23 is substantially radial (in the X-Y plane) to the longitudinal axis 25 of the borehole 2. The acoustic receiver 5 is used to measure the amplitude or pressure of the eigenwave 23.

Figure 3:
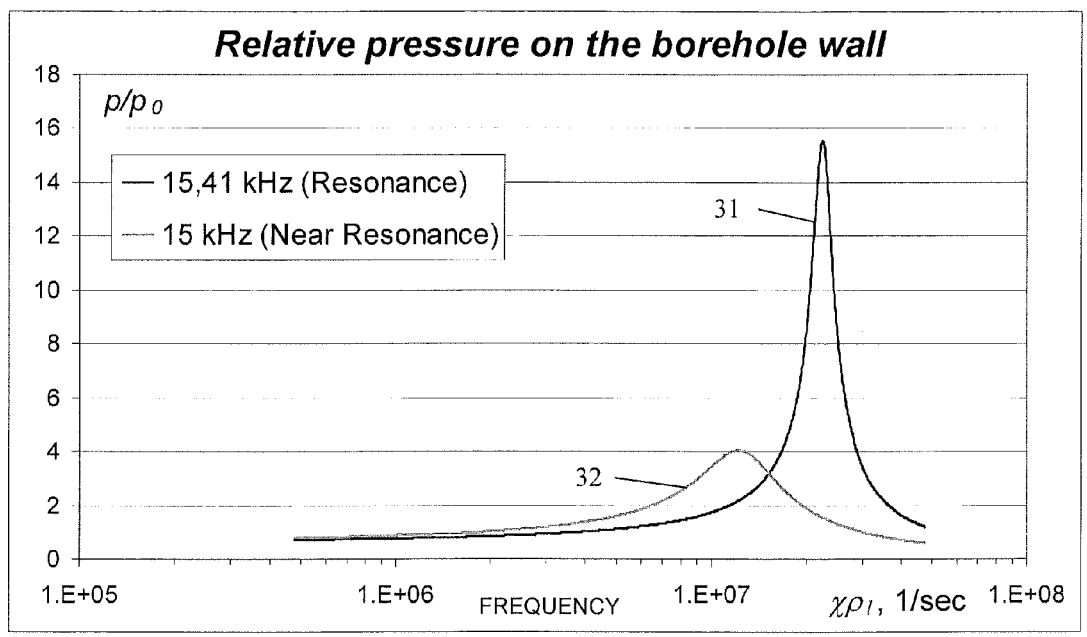
FIG. 3 illustrates a graphs of relative pressure on a wall of the borehole at a resonant frequency and a frequency close to the resonant frequency.

FIG. 3 illustrates graphs of relative pressure on the wall of the borehole 2 resulting from the input acoustic wave 21 at the resonant frequency and the input acoustic wave 21 near the resonant frequency. Referring to FIG. 3, a graph 31 shows the relative pressure increase (or jump) at the resonant frequency of 15.41 kHz. Referring to FIG. 3, a graph 32 shows the relative pressure increase (or jump) at the frequency 15 kHz that is near the resonant frequency. The relative pressure jump at the resonant frequency is greater than the relative pressure jump at a frequency near the resonant frequency resulting from the amplitude of the eigenwave 23 being greater than the amplitude of either the input acoustic wave 21 or the reflected acoustic wave 22.

The resonant frequency of the acoustic system that includes the borehole medium 8 and the porous medium of layer 4C can depend on the viscosity of the borehole medium 8. Therefore, changing the viscosity of the borehole medium 8 may shift the resonant frequency of the acoustic system. Shifting the resonant frequency of the acoustic system may provide a more sensitive regime for determination of the permeability of the porous saturated medium of the formations 4.

The input acoustic wave 21 may be provided by a single acoustic wave source 3 or a plurality of acoustic wave sources 3. The input acoustic wave 21 may be provided by at least one of a series of acoustic wave pulses and a continuous acoustic wave. The series of acoustic wave pulses allows the acoustic receiver 5 and the electronic unit 9 to easily separate the input acoustic wave 21 from the reflected acoustic wave 22 (when the frequency of the input acoustic wave 21 is not about the resonant frequency) in the time domain. The continuous acoustic wave may provide an improved signal to noise ratio.

The frequency of the input acoustic wave 21 may be varied to determine the resonant frequency of at least one of the layers of the formations 4. The frequency may be varied using at least one of the series of acoustic wave pulses (with each pulse having a different frequency) and the continuous acoustic wave. When the resonant condition is achieved, the eigenwave 23 will be formed.

The permeability of a porous saturated medium (e.g. layer 4C of the formations 4) can be determined from the following equations. The pressure on the wall of the borehole 2, resulting from the amplitude of the eigenwave 23, is used as input to determine the permeability. Other variables either are known or can be measured by other methods.

The characteristic frequency $f_{ch}$ of the layer can be represented in terms of the friction coefficient, $\chi$ (also referred to as kinetic phenomenological coefficient), such that $f_{ch}=\chi\rho_l=\eta/(\rho_0 k)$, (Equation (1)) where $\eta$—is fluid viscosity, $\rho_l$—is partial density of the fluid, and $\rho_0$—is the density of the porous saturated medium (layer of the formations 4), and k represents the permeability.

The theory describing radial oscillations for measuring permeability in a porous medium that is saturated with a formation fluid is based on a linearized version of the non-linear filtration theory. Such a theory assumes the following conservation laws as the initial set of differential equations:

the law of the conservation of total mass—

$$\frac{\partial \rho}{\partial t} + \mathrm{div}\, j = 0,$$

$$j = \rho_s u + \rho_l v,$$

(Equations (2) and (3), respectively)

the entropy, energy, and momentum conservation laws—

$$\frac{\partial S}{\partial t} + \mathrm{div}\left(\frac{S}{\rho}j\right) = \frac{R}{T},$$

$$\frac{\partial E}{\partial t} + \mathrm{div}\, Q = 0,$$

$$\frac{\partial j_i}{\partial t} + \partial_k \Pi_{ik} = 0;$$

(Equations (4), (5) and (6), respectively)

the first principle of thermodynamics—

$$dE_0 = TdS + \mu d\rho + (u-v, dj_0) + \frac{h_{ik}}{2} dg_{ik},$$

(Equation (7))

an equation describing the evolution of the metric tensor of deformations of the matrix $g_{ik}$ (wherein the matrix models the porous medium)—

$$\frac{\partial g_{ik}}{\partial t} + g_{ik}\partial_i u_j + g_{ij}\partial_k u_j + u_j \partial_j g_{ik} = 0;$$

(Equation (8))

a motion equation for the formation fluid (or electrolyte) in the porous medium—

$$\frac{\partial v}{\partial t} + (v, \nabla)v = -\nabla\mu - \frac{S}{\rho}\nabla T + f^\theta.$$

(Equation (9))

The total energy can be expressed as follows—

$$E = E_0 + vj_0 + \frac{\rho v^2}{2}.$$

(Equation (10))

In the equations presented, the following notations are used: $\rho$, $\rho_l$, $\rho_s$ are density of the porous medium that is saturated with the formation fluid, partial density of the formation fluid in the pores of the porous medium, and partial density of the porous medium, respectively; S, E, $E_0$ are entropy, energy, and internal energy per unit of volume of the porous medium that is saturated with the formation fluid, respectively; u, v are velocities of the porous medium and of the formation fluid contained in the porous medium; $\mu$, T are the chemical potential and temperature from the first principle of thermodynamics; and $j_0 = \rho_s(u-v)$ (Equation (11)) is the invariant component of the momentum.

The total energy expression is obtained from the energy equation used in hydrodynamic theory, extended to a two-velocity continuous medium. The motion equation for the fluid component contains the motion force in its right-hand side. This motion force is linear with respect to gradients of thermodynamic variables whose equilibrium values are constant within the scale of the system. The physical essence of this theory is determined by dependence of flows on thermodynamic variables and can be uniquely defined by the following physical principles of general nature: invariance of these equations in regard to the Galileo transformation, the conservation laws, and the second principle of thermodynamics for non-equilibrium systems. Based on these principles, dependences of flows and forces upon thermodynamic degrees of freedom can be determined:

for the stress tensor (a generalization of Murnagan formulae to a deformed porous medium)—

$$h_{ik} = -\rho^2 \frac{\partial(E_0/\rho)}{\partial \rho}\delta_{ik} - 2\rho g_{im}\frac{\partial(E_0/\rho)}{\partial g_{mk}};$$

(Equation (12))

where $\delta_{ik}$ represents the Kronecker delta;

for the density tensor of the momentum flow—

$$\Pi_{ik} = \rho_s u_i u_k + \rho_l v_i v_k + p\delta_{ik} + h_{ij}g_{jk},$$

(Equation (13))

Pressure is determined by this thermodynamic equation:

$$p = -E_0 + TS + \mu\rho + (u-v, j_0);$$

(Equation (14))

for the energy flow—

$$Q = \left(\mu + \frac{v^2}{2}\right)j + \frac{TS}{\rho}j + u(u, j_0) + u_i h_{km}g_{mi};$$

(Equation (15))

for the dissipative function—

$$R = f^\theta(\rho u - j).$$

(Equation (16))

for thermodynamic forces by means of introducing kinetic phenomenological coefficients $\chi$,—

$$f^\theta = \chi(\rho u - j),$$

(Equation (17)).

These equations do not take into account effects related to transfers of contaminating compound concentrations. Also, kinetic effects of scalar and tensor nature are not included. In irreversible vector flows, thermoconductivity effects are neglected. The state equation can be obtained both arbitrarily and in the Hook approximation by means of expansion of the internal energy according to thermodynamic degrees of freedom up to the cubic terms of the series, as discussed in "Mathematical modelling in the theory of multivelocity continuum", New York, Nova Science Publishers Inc., 1995, pp. 192, by A. M. Blokhin, and V. N. Dorovsky.

These equations describe electrolyte (or formation fluid) filtration in a porous matrix undergoing arbitrary elastic deformations.

The acoustic field in fluid is described by linear equations, which determine the velocity of hydrodynamic oscillations in fluid—

$$\ddot{v} - c_{p0}^2 \nabla \mathrm{div}\, v = 0,$$

(Equation (18))

where $c_{p0}$ represents sound velocity in the fluid.

The acoustic field in the porous medium that is saturated with the formation fluid can be described by these equations—

$$\ddot{u} - c_t^2 \Delta u - a_1 \nabla div u + a_2 \nabla div v + \frac{\rho_l^2 \chi}{\rho_s}(\dot{u}-\dot{v}) = 0,$$

$$\ddot{v} - a_4 \nabla div v + a_3 \nabla div u - \rho_l \chi(\dot{u}-\dot{v}) = 0.$$

(Equations (19) and (20), respectively)

where $\rho_l$, $\rho_s$ are partial densities of fluid and solid, respectively;
$\rho_0 = \rho_l + \rho_s$, $a_j$ are values determined by three elastic moduli $\lambda, \mu, \alpha_3$ as follows:

$$a_1 = \rho_s \rho_0 \alpha_3 + \frac{\rho_l^2}{\rho_0^2}\frac{K}{\rho_s} + \frac{1}{3}\frac{\mu}{\rho},$$

$$a_2 = \frac{\rho_l}{\rho_s}\left(\frac{\rho_l}{\rho_0^2}K - \rho_s\rho_0\alpha_3\right),$$

$$a_3 = \frac{\rho_l}{\rho_0^2}K - \rho_s\rho_0\alpha_3,$$

$$a_4 = \frac{\rho_l}{\rho_0^2}K + \rho_l\rho_0\alpha_3,$$

$$K = \lambda + \frac{2}{3}\mu.$$

(Equations (21) and (22), respectively)

(Equations (23), (24), and (25), respectively)

These three elastic moduli $\lambda, \mu, \alpha_3$ are obtained from the formulae given below through acoustic velocities measured at a high frequency:

$$\mu = \rho_s c_t^2,$$

$$K = \frac{1}{2}\frac{\rho_s}{\rho_l}\left(\rho_0 c_{p1}^2 + \rho_0 c_{p2}^2 - \frac{8}{3}\rho_l c_t^2 - \sqrt{(\rho_0 c_{p1}^2 - \rho_0 c_{p2}^2)^2 - \frac{64}{9}\rho_s\rho_l c_t^4}\right)$$

$$\alpha_3 = \frac{1}{2\rho_0^3}\left(\rho_0 c_{p1}^2 + \rho_0 c_{p2}^2 - \frac{8}{3}\rho_s c_t^2 + \sqrt{(\rho_0 c_{p1}^2 - \rho_0 c_{p2}^2)^2 - \frac{64}{9}\rho_s\rho_l c_t^4}\right)$$

(Equations (26), (27), and (28), respectively)

where $c_{p1}$ represents first longitudinal velocity of the porous medium, $c_{p2}$ represents second longitudinal velocity of the porous medium, and $c_t$ represents share velocity of the porous medium.

Below, where the boundary conditions for the equations above are given, the bracketed index refers to values related to the fluid (or the borehole medium 8) (0) and the porous medium (1),:

1) at the surface of the source, which excites oscillations in the fluid in the borehole 2—(r=r$_1$, see FIG. 2A): $p^{(0)} = P_0$. (Equation (29))

2) at the interface of the borehole 2 and the porous medium (of the formations 4) (r=r$_2$, see FIG. 2A):

$$(1-d_0)u_r^{(1)} + d_0 v_r^{(1)} = v_r^{(0)}, \frac{p^{(1)}}{\rho_0^{(1)}} = \frac{p^{(0)}}{\rho_0^{(0)}},$$

$$\rho_l \chi(\varphi_u^{(1)} - \varphi_v^{(1)}) = \frac{p^{(0)}}{\rho_0^{(0)}}, \sum_{rr}^{(1)} = \sum_{rr}^{(0)},$$

$$\sum_{zr}^{(1)} = 0.$$

(Equations (30), (31), (32), and (33), respectively)

where $d_0$ represents the porosity of the porous medium and where $\phi_{u,v}$ are potentials, which determine the velocity of radial oscillations of the medium:

$$u = \nabla \phi_u, \quad v = \nabla \phi_v.$$

(Equations (33) and (34), respectively)

Components of stress tensors and pressures are determined through displacement velocities in the general form, as follows:

$$\sum_{zr}^{(1)} = -\mu\left(\frac{\partial u_z}{\partial r} + \frac{\partial u_r}{\partial z}\right) = -\mu u_z',$$

(Equation (35))

$$\sum_{rr}^{(1)} = -p^{(1)} - h_{rr}^{(1)}$$

$$= \left(\alpha_3 \rho_0^2 \rho_s - \frac{2}{3}\mu\right)div\ u + \alpha_3 \rho_0^2 \rho_l div v + 2\mu u_r',$$

(Equation (36))

$$\sum_{rr}^{(1)} \equiv \mu_1 div u + \mu_2 div v + 2\mu u_r',$$

(Equation (37))

-continued $$\sum_{rr}^{(0)} = -\dot{p}^{(0)}$$

$$= \rho_0^{(0)} c_{p0}^2 div v^{(0)}$$

$$\equiv \lambda_0 div v^{(0)},$$

$$-\dot{p}^{(1)} = \left(\alpha_3 \rho_0^2 \rho_s - \frac{\rho_l}{\rho_0}K\right)div u^{(1)} + \left(\alpha_3 \rho_0^2 \rho_l + \frac{\rho_l}{\rho_0}K\right)div v^{(1)}$$

$$\equiv \pi_1 div u^{(1)} + \pi_2 div v^{(1)}.$$

(Equations (38), and (39), respectively)

The above system of equations (Equations (1) through (39)) may be solved to determine the permeability, k, using numerical analysis calculation techniques known to those skilled in the art of numerical analysis.

Generally, the well logging instrument 10 includes adaptations as may be necessary to provide for operation during drilling or after a drilling process has been completed.

Figure 4:
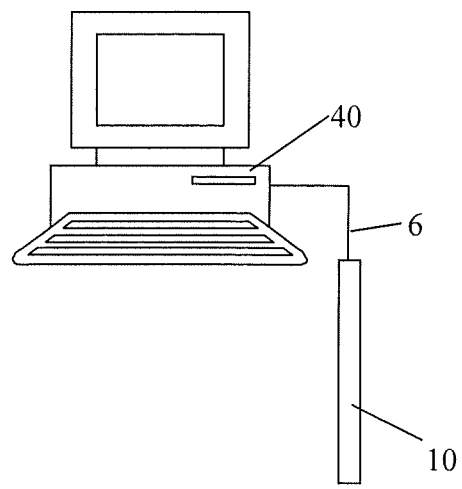
FIG. 4 illustrates an exemplary embodiment of a computer coupled to the logging instrument.

Referring to FIG. 4, an apparatus for implementing the teachings herein is depicted. In FIG. 4, the apparatus includes a computer 40 coupled to the well logging instrument 10. Typically, the computer 40 includes components as necessary to provide for the real time processing of data from the well logging instrument 10. Exemplary components include, without limitation, at least one processor, storage, memory, input devices, output devices and the like. As these components are known to those skilled in the art, these are not depicted in any detail herein.

Generally, some of the teachings herein are reduced to an algorithm that is stored on machine-readable media. The algorithm is implemented by the computer 40 and provides operators with desired output. The output is typically generated on a real-time basis.

The logging instrument 10 may be used to provide real-time measurements of the permeability of a porous medium of the formations 4. As used herein, generation of data in "real-time" is taken to mean generation of data at a rate that is useful or adequate for making decisions during or concurrent with processes such as production, experimentation, verification, and other types of surveys or uses as may be opted for by a user or operator. Accordingly, it should be recognized that "real-time" is to be taken in context, and does not necessarily indicate the instantaneous determination of data, or make any other suggestions about the temporal frequency of data collection and determination.

A high degree of quality control over the data may be realized during implementation of the teachings herein. For example, quality control may be achieved through known techniques of iterative processing and data comparison. Accordingly, it is contemplated that additional correction factors and other aspects for real-time processing may be used. Advantageously, the user may apply a desired quality control tolerance to the data, and thus draw a balance between rapidity of determination of the data and a degree of quality in the data.

Figure 5:
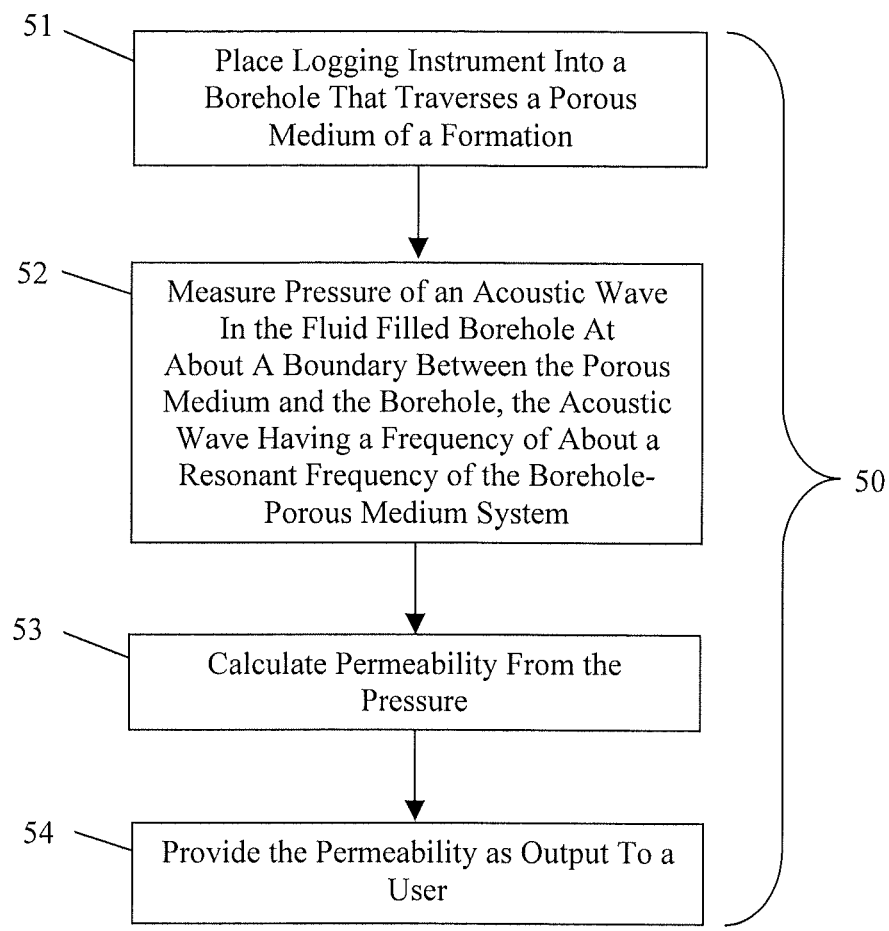
FIG. 5 presents one example of a method for measuring permeability of a formation from within the borehole.

FIG. 5 presents one example of a method 50 for measuring the permeability of a porous medium of the formations 4. The method 50 calls for (step 51) placing the logging instrument 10 into the borehole 2 that traverses the porous medium. Further, the method 50 calls for (step 52) measuring a pressure of an acoustic wave in the borehole 2 filled with the borehole medium 8 at about the boundary between the porous medium and the borehole 2. In step 52, the acoustic wave has a frequency that is about the resonant frequency of the porous medium. The acoustic wave may be the eigenwave 23. Further, the method 50 calls for (step 53) calculating the permeability from the pressure. Further, the method 50 calls for (step 54) providing the permeability as output to a user.

In support of the teachings herein, various analysis components may be used, including digital and/or analog systems. For example, the digital and/or analog systems may be used for the electronic unit 9. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling unit, heating unit, motive force (such as a translational force, propulsional force or a rotational force), sensor, transmitter, receiver, transceiver, controller, amplifier, electrical unit, or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" are intended to be inclusive such that there may be additional elements other than the elements listed.

While the invention has been described with reference to exemplary embodiments, it will be understood by those skilled in the art that various changes may be made and equivalents may be substituted for elements thereof without departing from the scope of the invention. In addition, many modifications may be made to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for determining permeability of a porous medium of a formation, the method comprising:
    placing a logging instrument into a borehole that traverses the porous medium, the borehole filled with a borehole fluid;
    measuring a pressure, $p^{(1)}$, of an acoustic wave in the borehole at a boundary between the porous medium and the borehole, the acoustic wave comprising a frequency that is about a resonant frequency of a system comprising the borehole and the porous medium;
    calculating the permeability directly from the pressure; and
    providing the permeability as output to a user.

2. The method as in claim 1, further comprising generating acoustic waves with various frequencies to determine the resonant frequency wherein the acoustic waves are generated in a direction substantially radial to the longitudinal axis of the borehole.

3. The method as in claim 1, further comprising generating an input acoustic wave at about the resonant frequency wherein the input acoustic wave is generated in a direction substantially radial to the longitudinal axis of the borehole.

4. The method as in claim 1, wherein the resonant frequency is a fundamental frequency.

5. The method as in claim 1, wherein the acoustic wave comprises an eigenwave.

6. The method as in claim 1, further comprising changing the viscosity of the borehole fluid to shift sensitivity for determining the permeability.

7. The method as in claim 1, wherein calculating comprises solving a relationship for the permeability, the relationship comprising:
- an equation relating a characteristic frequency, $\chi\rho_1$, to the permeability, k, such that $\chi\rho_l=\eta/(\rho_0 k)$, where $\chi$ represents a phenomeno logical coefficient, $\rho_l$ represents a partial density of a fluid, $\rho_0$ represents the density of the porous medium that is saturated by the fluid, and $\eta$ represents the viscosity of the fluid;
- an equation for the law of conservation of mass;
- an equation for the law of conservation of entropy;
- an equation for the law of conservation of energy;
- an equation for the law of conservation of momentum;
- an equation describing the first principle of thermodynamics;
- an equation describing metric tensor deformations of the porous medium;
- an equation describing a motion of the fluid in the porous medium;
- an equation expressing total energy of the porous medium;
- an equation for a stress tensor;
- an equation for a density tensor for momentum flow;
- an equation for pressure;
- an equation for energy flow;
- an equation for a dissipative function;
- an equation relating thermodynamic forces and the phenomenological coefficient;
- an equation describing a velocity of hydrodynamic oscillations in the fluid;
- an equation describing a velocity of hydrodynamic oscillations in the porous medium; and
- an equation for a displacement velocity.

8. The method as in claim 7, further comprising the following boundary conditions:
- source pressure, $p^{(0)}$, at a surface of a source of an input acoustic wave equals a known value, the source being in the borehole;
- component of stress tenor for the porous medium in direction of the longitudinal axis of the borehole equals zero; and
- radial component of stress tensor for the borehole fluid equals radial component of stress tensor for the porous medium.

9. The method as in claim 7, further comprising the following boundary condition:

$$(1-d_0)u_r^{(1)}+d_0 v_r^{(1)}=v_r^{(0)}$$

where $d_0$ represents the porosity of the porous medium that comprises the fluid and a porous matrix, $u_r^{(1)}$ represents a radial velocity of the porous matrix, $v_r^{(1)}$ represents a radial velocity of the fluid, and $v_r^{(0)}$ represents a radial velocity of the borehole fluid.

10. The method as in claim 7, further comprising the following boundary condition:

$$\frac{p^{(1)}}{\rho_0^{(1)}} - \rho_l \chi(\varphi_u^{(1)} - \varphi_v^{(1)}) = \frac{p^{(0)}}{\rho_0^{(0)}}$$

where $p^{(0)}$ represents source pressure at a surface of a source of an input acoustic wave, $\rho_l$ represents partial density of the fluid in the pores of the porous medium, $\rho_0^{(1)}$ represents density of the porous medium that is saturated, $\rho_0^{(0)}$ represents density of the borehole fluid, and $\phi_u^{(1)}$ and $\phi_v^{(1)}$ are potentials that determine the velocity of radial oscillations of the porous medium such that:
- $u=\nabla\phi_u^{(1)}$ and $v=\nabla\phi_v^{(1)}$ where u represents the velocity vector of the porous medium and v represents the velocity vector of the fluid contained in the porous medium.

11. An apparatus for determining permeability of a porous medium in a formation traversed by a borehole, the apparatus comprising:
- an acoustic wave source for generating an input acoustic wave into the borehole in substantially a radial direction with respect to the longitudinal axis of the borehole, the borehole filled with a borehole fluid;
- an acoustic wave receiver for receiving an acoustic wave from the porous medium, with the receiver in the borehole at a boundary between the porous medium and the borehole; and
- an electronic unit for measuring a pressure, $p^{(1)}$, of the acoustic wave received by the receiver, the acoustic wave comprising a frequency that is about a resonant frequency of a system comprising the borehole and the porous medium; calculating the permeability directly from the pressure; and providing the permeability as output to a user.

12. The apparatus as in claim 11, wherein the acoustic wave source generates the input acoustic wave at about the resonant frequency.

13. The apparatus as in claim 11, wherein the acoustic wave source generates a wave pulse.

14. The apparatus as in claim 11, wherein the acoustic wave source generates a continuous wave.

15. The apparatus as in claim 11, wherein the acoustic wave source generates the input acoustic wave at about the fundamental frequency.

16. The apparatus as in claim 11, wherein the acoustic wave source generates acoustic waves with various frequencies determine the resonant frequency.

17. The apparatus as in claim 11, wherein the acoustic receiver receives a magnitude of an eigenwave.

18. The apparatus as in claim 11, wherein the output comprises at least one of an electrical signal, an optical signal, a magnetic medium, an optical medium, and an electronic medium.

19. The apparatus as in claim 11, wherein the acoustic wave source, the acoustic receiver, and the electronic unit are disposed within a logging instrument.

20. A computer program product comprising machine readable instructions stored on machine readable media for determining permeability of a porous medium in a formation traversed by a borehole filled with a borehole fluid, the product comprising machine executable instructions for:
- determining a resonant frequency of a system comprising the borehole and the porous medium;
- measuring a pressure, $p^{(1)}$, of an acoustic wave in the borehole at a boundary between the porous medium and the borehole, the acoustic wave comprising a frequency that is about a resonant frequency of the system;
- calculating the permeability directly from the pressure; and
- providing the permeability as output to a user.

* * * * *